(12) United States Patent
Phillips

(10) Patent No.: US 11,264,783 B2
(45) Date of Patent: Mar. 1, 2022

(54) HEADLOCK CABLE INSTALLATION SYSTEM

(71) Applicant: Mastercard International Incorporated, Purchase, NY (US)

(72) Inventor: Christopher K. Phillips, Kansas City, MO (US)

(73) Assignee: Mastercard International Incorporated, Purchase, NY (US)

(*) Notice: Subject to any disclaimer, the term of this patent is extended or adjusted under 35 U.S.C. 154(b) by 129 days.

(21) Appl. No.: 16/740,781

(22) Filed: Jan. 13, 2020

(65) Prior Publication Data

US 2021/0214181 A1 Jul. 15, 2021

(51) Int. Cl.

| H02G 1/00 | (2006.01) |
|---|---|
| H02G 3/00 | (2006.01) |
| H02G 1/08 | (2006.01) |
| B23Q 3/00 | (2006.01) |
| B23Q 5/22 | (2006.01) |

(52) U.S. Cl.
CPC ............... H02G 1/00 (2013.01); H02G 1/08 (2013.01); H02G 1/081 (2013.01); H02G 1/083 (2013.01); H02G 3/00 (2013.01); B23Q 3/005 (2013.01); B23Q 5/22 (2013.01); H02G 1/088 (2013.01)

(58) Field of Classification Search
CPC ........ H02G 1/083; H02G 1/085; H02G 1/088; H02G 1/081; H02G 1/08; H02G 1/06; H02G 1/00; H02G 3/00; B23Q 3/005; B23Q 3/00; B23Q 5/22; B23Q 5/00; G02B 6/50

USPC .................................................. 254/134.3 FT
See application file for complete search history.

(56) References Cited

U.S. PATENT DOCUMENTS

| 5,431,370 A | * | 7/1995 | Verkuylen | ............... | H02G 1/085 |
|---|---|---|---|---|---|
| | | | | | 254/134.3 FT |
| 8,944,411 B2 | * | 2/2015 | Cooke | ................... | H02G 1/081 |
| | | | | | 254/134.3 R |
| 10,027,097 B1 | * | 7/2018 | Jordan | .................... | F16G 11/02 |
| 2012/0090145 A1 | * | 4/2012 | Montena | ................ | H02G 1/081 |
| | | | | | 29/428 |
| 2015/0000103 A1 | * | 1/2015 | McAvoy | ................ | H02G 1/081 |
| | | | | | 29/447 |
| 2019/0148922 A1 | * | 5/2019 | Williams | ................. | B25G 1/04 |
| | | | | | 254/134.3 R |

* cited by examiner

*Primary Examiner* — Lee D Wilson
*Assistant Examiner* — Robert F Neibaur
(74) *Attorney, Agent, or Firm* — Hovey Williams LLP

(57) ABSTRACT

A headlock cable installation system includes a headlock assembly, an extension rod, and a flexible headlock cable. The headlock cable installation system is used for installing a pre-connectorized cable assembly. The headlock assembly defines a cavity configured to receive a connectorized end of the pre-connectorized cable assembly. The flexible headlock cable has opposite first and second ends. The first end of the headlock cable is coupled to the headlock assembly, whereas the opposite second end of the headlock cable is adjustably coupled to the extension rod. Adjustment of the second end varies a position of the headlock assembly relative to the extension rod.

19 Claims, 6 Drawing Sheets

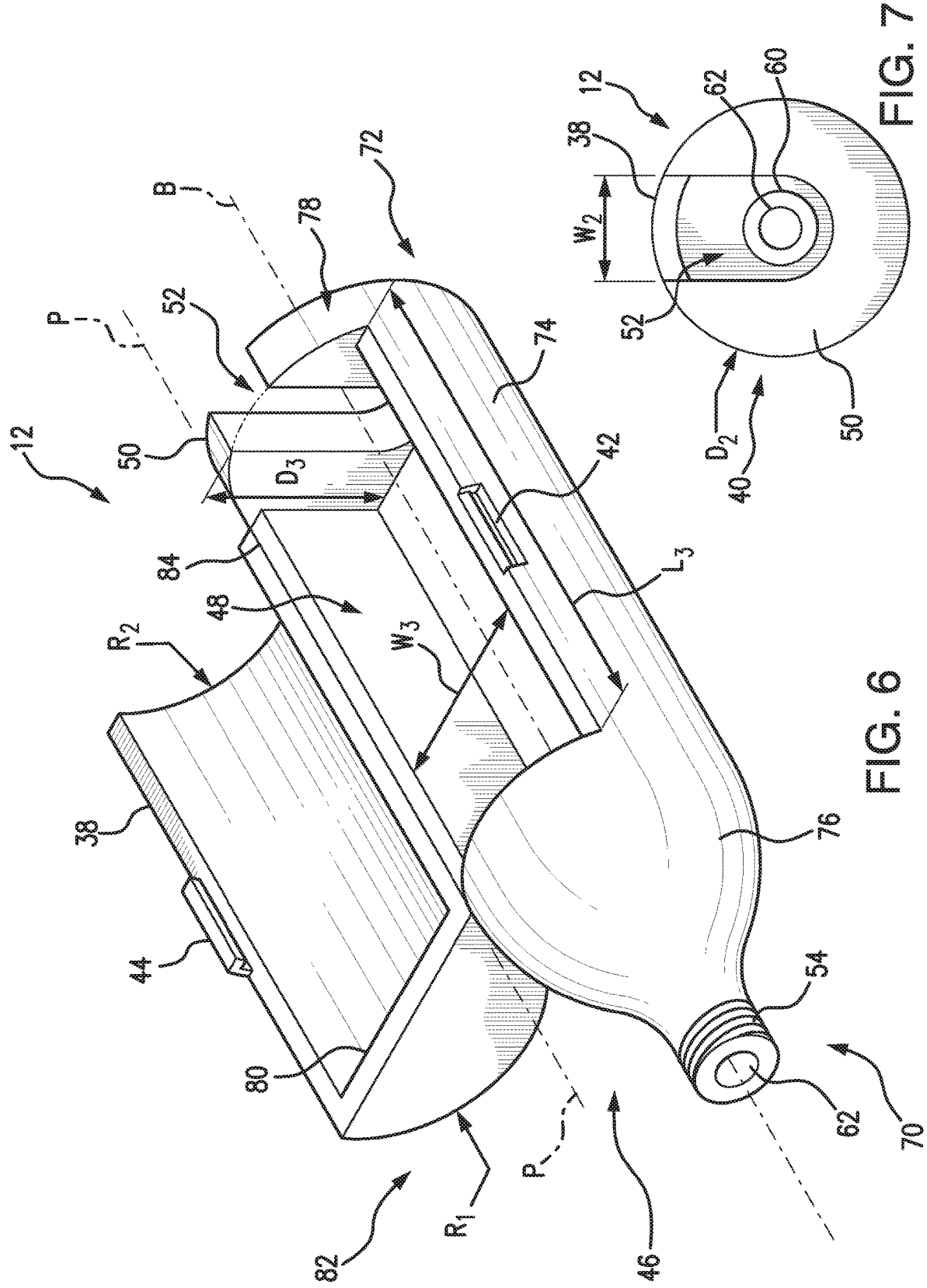

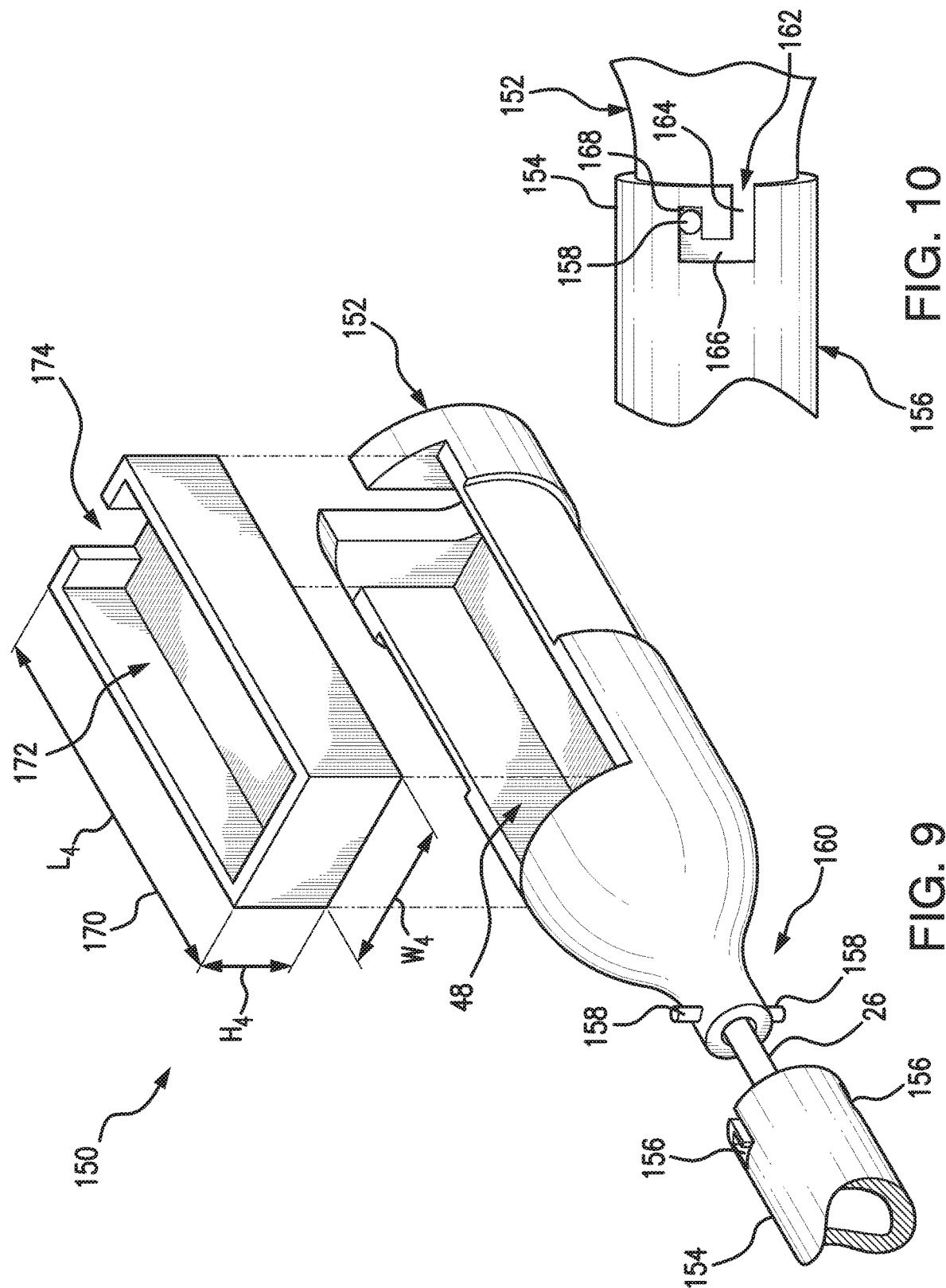

HEADLOCK CABLE INSTALLATION SYSTEM

FIELD OF THE DISCLOSURE

The field of the disclosure relates generally to cable installation systems and, more particularly, to systems and methods for installing a cable having its ends terminated with connectors.

BACKGROUND

Installing and routing cables in data center cabinets typically includes routing the cables along the tops of the data center cabinets and dropping one or more cables down through an opening in the top of a selected cabinet. Typically, data center cabinets have a height that requires data center technicians to use ladders to route the cables along the tops of the data center cabinets. However, the use of ladders to route the cables can be dangerous because of fall risks due to ladder slipage and/or the data center technician losing balance while reaching across the data center cabinets to lay out the cables. Furthermore, the use of ladders is inefficient, requiring the data technician to first retrieve a ladder and then to constantly reposition the ladder when installing the cables.

Generally, the cables being installed or routed in the data center are terminated with connectors (e.g., pre-connectorized cable assemblies) to facilitate the ease of connecting the cables between components installed in the data center cabinets. Such pre-connectorized cable assemblies however can be difficult to install. For example, during installation, the connector on a pre-connectorized cable assembly can catch on other cables in the data center cabinets, which can damage the connector when trying to push or pull the pre-connectorized cable assembly through the data center cabinet. In addition, typical "fish tape" cable pulling devices generally require a cable to be secured to an end of the fish tape, which is generally achieved by taping the cable to a hook or eye of the fish tape. Taping a pre-connectorized cable assembly to a traditional fish tape device is time consuming, inefficient, and wasteful. Moreover, removing the tape from the pre-connectorized cable assembly can damage the connector.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, a headlock cable installation system for installing a pre-connectorized cable assembly is provided. The headlock cable installation system includes a headlock assembly defining a cavity, which is configured to receive a connectorized end of the pre-connectorized cable assembly therein. The headlock cable installation system also includes an extension rod. Furthermore, the headlock cable installation system includes a flexible headlock cable having opposite first and second ends. The first end is coupled to the headlock assembly, and the opposite second end is adjustably coupled to the extension rod. Adjustment of the second end varies a position of the headlock assembly relative to the extension rod.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 6 is a perspective view of the headlock assembly shown in FIG. 1 illustrated in the opened configuration;

FIG. 7 is an end view of the headlock assembly shown in FIG. 6 illustrated in the closed configuration and looking at the end wall;

FIG. 9 is a perspective view of an alternative headlock cable installation system having an alternative headlock assembly locking feature and an alternative extension rod locking feature; and FIG. 10 is an enlarged perspective view of a portion of the headlock cable installation system shown in FIG. 9.

Figure 1:
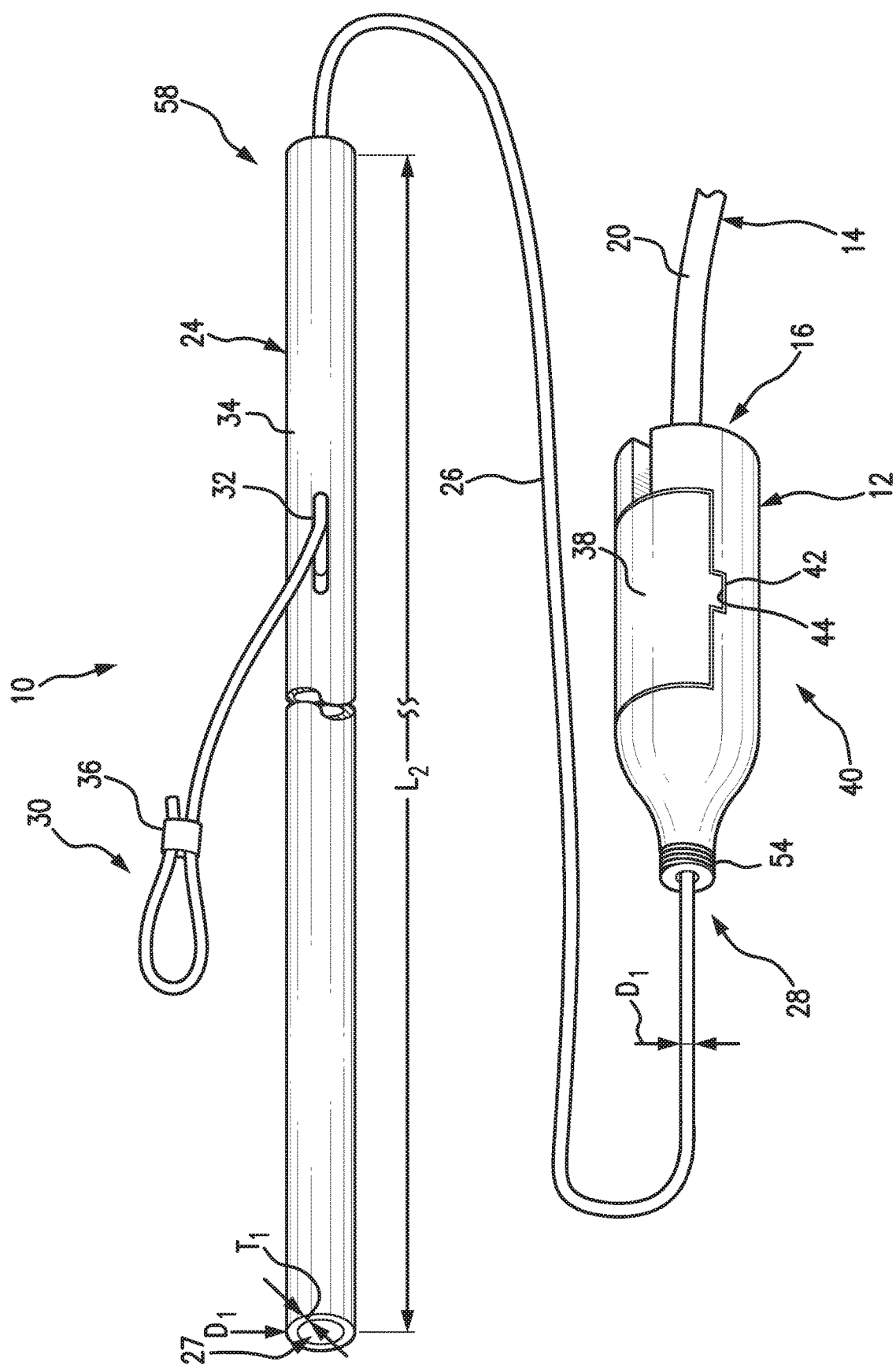
FIG. 1 is a perspective view of a headlock cable installation system in accordance with one embodiment of the present invention.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled. It is contemplated that the disclosure has general application to installing pre-connectorized cable assemblies, particularly in data centers having a plurality of data center cabinets, in industrial, commercial, and residential applications.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, etc. described in one embodiment may also be included in other embodiments but is not necessarily included. Thus, the present technology can include a variety of combinations and/or integrations of the embodiments described herein.

In the following specification and the claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations extending substantially parallel to a longitudinal or central axis of the headlock assembly. The terms "radial" and "radially" refer to directions and orientations extending substantially perpendicular to the longitudinal or central axis of the headlock assembly. The terms "tangent" and "tangentially" refer to the directions and orientations extending substantially perpendicular to a radial direction of the headlock assembly. In addition, as used herein, the terms "circumferential" and "circumferentially" refer to directions and orientations extending in the general direction in which a circle extends around the longitudinal or central axis of the headlock assembly (such references not being limited to the periphery or outer perimeter of the object unless the context clearly indicates otherwise). Furthermore, the terms "circumferential" and "circumferentially" do not require the corresponding component, surface, etc. to be circular in shape, unless stated otherwise.

Directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

Figure 2:
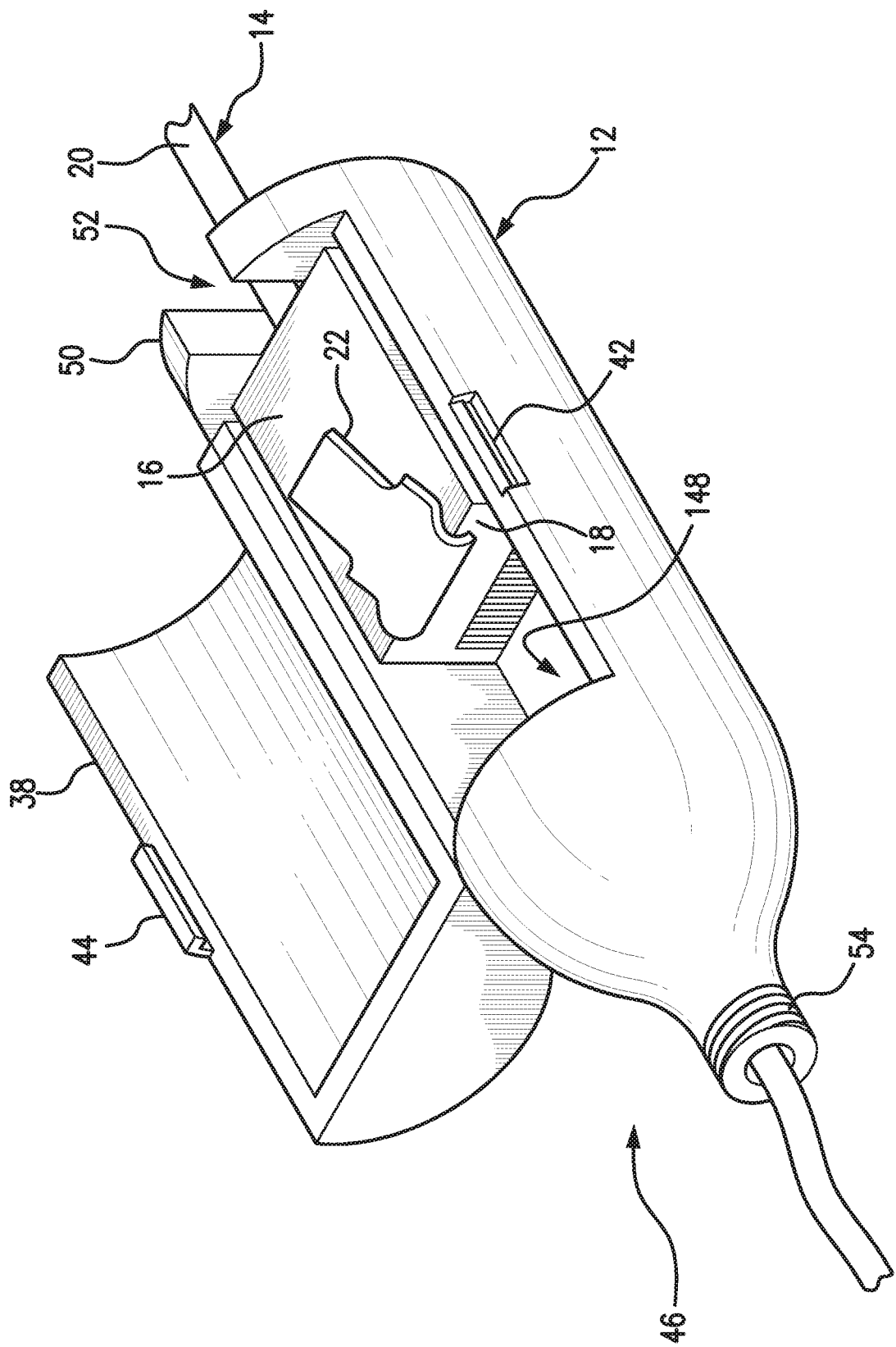
FIG. 2 is a partial perspective view of a headlock assembly shown in FIG. 1, illustrated in an opened configuration to show a connector attached thereto.

FIG. 1 is a perspective view of a headlock cable installation system 10, in accordance with one embodiment of the present invention. FIG. 2 is a perspective view of a headlock assembly 12 in an opened configuration 46. The headlock cable installation system 10 is configured to push and pull a pre-connectorized cable assembly 14, for example, during an installation of the cable assembly 14. In particular, the headlock assembly 12 of the headlock cable installation system 10 is configured to hold or secure the connectorized end 16 of the pre-connectorized cable assembly 14 therein to reduce a risk of damage to a connector 18 of the pre-connectorized cable assembly 14 and/or reduce a risk of catching or snagging the pre-connectorized cable assembly 14 on other cables, components, or structures during installation.

In the exemplary embodiment, the pre-connectorized cable assembly 14 includes a cable 20 coupled to the connector 18. The cable 20 includes, for example, and without limitation, twisted-pair cables, optical fiber cables, coaxial cables, stranded cables, and the like. In one suitable embodiment, the cable 20 is a twisted-pair cable, including for example, Ethernet cables such as category 5 cable ("Cat5"), category 5e (enhanced) ("Cat5e"), category 6 cable ("Cat6"), category 6a cable ("Cat6a"), category 7 cable ("Cat7"), and the like. In another suitable embodiment, the cable 20 is an optical fiber cable such as a single mode cable, a multi-mode cable, and the like. In alternative aspects of the present invention, the cable 20 is any type of cable that enables the headlock assembly 12 to function as described herein.

In the exemplary embodiment, standard connectors (e.g., modular connectors) are used to connect the pre-connectorized cable assembly 14 to electronic devices (not shown), for example, in a data center and/or a computer network. Typically, male plugs, such as the illustrated connector 18, terminate the cable 20, and female jacks (not shown) are incorporated into other components, equipment, cables, etc., such as in computer equipment contained in a data center. The connectors couple together via a spring-loaded tab 22 on the connector 18 (i.e., the plug), which snaps into the female jack (not shown).

Connectors come in all shapes and sizes. For example, modular connectors come in 4-, 6-, 8-, and 10-position sizes, where a position is defined as a location for a contact or pin for a wire conductor. The contacts of modular connectors generally have sharp prongs that, when the connector is crimped to an end of the cable, such as the cable 20, pierce insulation of the wire conductor and make an electrical connection with the wire conductor. It is noted that in some cable assemblies, not all of the positions of the connector have contacts and/or some contacts of the connector are not connected to a respective wire conductor. Alternatively, for the use and construction of optical fiber cables, there are various standard optical fiber connectors, including, for example, and without limitation, LC, MT-RJ, and MTP/MPO optical fiber connectors. Optical fiber connectors generally use an adhesive to attach or secure the fiber of an optical fiber cable to the connector. The end of the fiber is polished and subsequently bonded in place in the optical fiber cable.

In the exemplary embodiment, as shown in FIG. 2, the connector 18 is a modular 8-position, 8-pin connector, or as is commonly known, an RJ45 connector. RJ45 connectors are used, for example, to terminate twisted-pair cables in computer networks, wherein the twisted-pair cable includes up to eight (8) wire conductors arranged in up to four (4) twisted pairs. As described herein, such network cables include Cat5, Cat5e, Cat6, Cat6a, and Cat7 Ethernet cables.

Referring back to FIG. 1, the headlock cable installation system 10 includes the headlock assembly 12 coupled to an extension rod 24 via a headlock cable 26. In the exemplary embodiment, the preferred extension rod 24 is at least partially hollow (or tubular), defining an internal cavity 27 therein so as to receive a portion of the headlock cable 26 therethrough. A first end 28 of the headlock cable 26 is fixed or coupled to the headlock assembly 12, as described further herein. A second end 30 of the headlock cable 26 extends into the internal cavity 27 and through a portion of the extension rod 24. The headlock cable 26 exits the internal cavity 27 through a slotted opening 32 defined in a sidewall 34 of the extension rod 24. Alternatively, in some suitable embodiments, the extension rod 24 may be tubular from end-to-end with the headlock cable 26 projecting outwardly from each end of the extension rod. In addition, in certain embodiments, the extension rod 24 may have an external channel defined longitudinally along a length of the extension rod. In such an embodiment, the headlock cable 26 could be slidably received within the channel. It is also noted, that in some embodiments, the extension rod 24 can be telescopic such that a shiftable end of the extension rod can be connected to the headlock assembly 12.

In the exemplary embodiment, the second end 30 of the headlock cable 26 is arranged in a loop to facilitate pulling the headlock cable 26 through the extension rod 24. The loop can be formed, for example, by turning the end of the headlock cable 26 back along the headlock cable 26 and installing a crimp 36. However, it is noted that the loop may be formed in any manner that enables the headlock cable installation system 10 to function as described herein. In addition, in some embodiments of the present invention, the headlock cable 26 may be free of a loop formed at the second end 30, and/or may include a knot, handle, or any other means for gripping the second end 30 of the headlock cable 26 to facilitate pulling the headlock cable 26 through the extension rod 24.

The headlock cable 26 is fabricated from one of a natural fiber rope and synthetic fiber rope. Natural fiber ropes include, for example and without limitation, cotton rope, manila rope, and the like. Synthetic fiber ropes include, for example, and without limitation, nylon, polyester, polypropylene, and the like. In addition, the headlock cable 26 can be fabricated as one of a braided and a twisted rope. Alternatively, the headlock cable 26 can be fabricated from any rope or cable that enables the headlock cable 26 to function as described herein, including, for example, wire rope, cord, metal cable, and the like. In the exemplary embodiment, the headlock cable 26 has a diameter $D_1$ that is in the range between and including about one hundred and twenty thousandths of an inch (0.120 in.) and about one hundred and eighty-eight thousandths of an inch (0.188 in.).

Alternatively, in other aspects of the present invention, the headlock cable 26 can have any diameter that enables the headlock cable installation system 10 to function as described herein.

As illustrated in FIGS. 1 and 2, the headlock cable installation system 10 is shown receiving the pre-connectorized cable assembly 14. In particular, the connectorized end 16 is received in the headlock assembly 12. A hinged cap 38 of the headlock assembly 12 is held or secured in a closed configuration 40 via a latch 42 configured to receive a latch finger 44 coupled to the hinged cap 38. As shown in FIG. 2, the connector 18 is received within a cavity 48 of the headlock assembly 12, with an end of the connector 18 being adjacent an end wall 50 of the headlock assembly 12. The cable 20 extends through a cable slot 52 defined in the end wall 50. In this manner, when the headlock assembly 12 is pulled, for example by a pulling force being applied to the headlock cable 26, the pulling force is translated to the headlock assembly 12, which translates the pulling force to the connector 18.

As described above, the headlock cable installation system 10 is configured to push and pull the pre-connectorized cable assembly 14. As such, the headlock assembly 12 may be releasably coupled to the extension rod 24 to enable the headlock assembly 12 to be pushed by the extension rod 24. In the exemplary embodiment, the headlock assembly 12 includes a plurality of external threads 54 to facilitate attaching the headlock assembly 12 to the extension rod 24. However, in alternative embodiments, other means for connecting the headlock assembly 12 to the extension rod 24 may be employed, as is described further herein.

Figure 3:
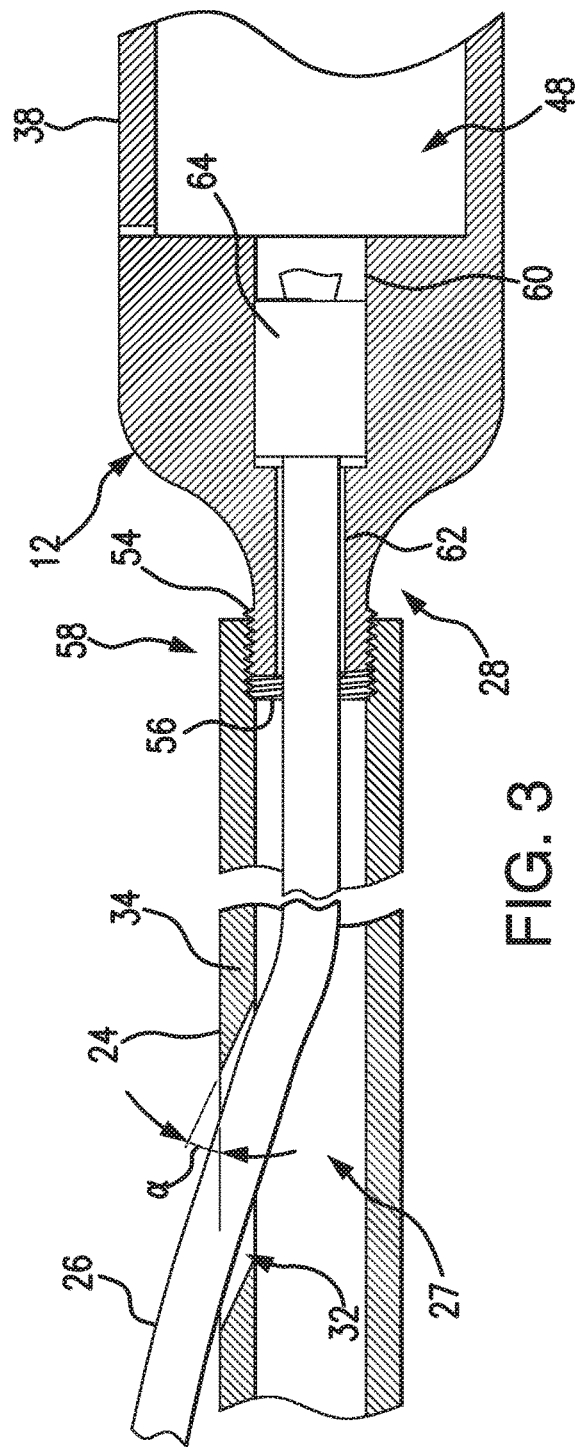
FIG. 3 is a section view of a portion of the headlock cable installation system shown in FIG. 1, illustrating the headlock assembly coupled to the extension rod.

FIG. 3 is a section view of a portion of the headlock cable installation system 10, illustrating one method of the headlock assembly 12 being coupled to the extension rod 24. The extension rod 24 includes a plurality of internal threads 56 formed in an open first end 58 of the extension rod 24. The headlock assembly 12 is threadably coupled to the open first end 58 of the extension rod 24 via the plurality of threads 54 and 56. When the headlock assembly 12 is attached to the extension rod 24, the headlock cable 26 may be stored within the internal cavity 27 of the extension rod 24 and/or may be pulled through the slotted opening 32 defined in the sidewall 34 thereof.

As described above, the first end 28 of the headlock cable 26 is fixed to the headlock assembly 12. In particular, FIG. 3 illustrates the headlock assembly 12 having a counterbore hole including a counterbore 60 formed generally concentric with a through hole 62. The counterbore hole is positioned within the cavity 48 of the headlock assembly 12. The first end 28 of the headlock cable 26 is inserted through the hole 62 where it extends into the counterbore 60. A crimp 64 or other type of locking element is attached to the end of the headlock cable 26. The crimp 64 is sized and shaped to fit securely within the counterbore 60 without passing through the hole 62. In this manner, the headlock cable 26 is fixed to the headlock assembly 12 and does not extend into the cavity 48. In alternative embodiments of the present invention, the headlock cable 26 may be fixed to the counterbore 60 in any manner that enables the headlock cable installation system 10 to function as described herein, including, for example, knotting the headlock cable 26 within the counterbore 60, applying an adhesive to the headlock cable 26 within the counterbore 60, etc.

Figure 4:
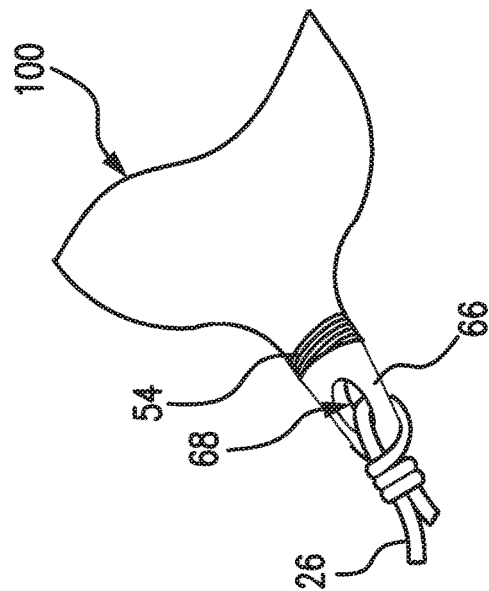
FIG. 4 is a partial perspective view of an alternative headlock assembly, illustrating an alternative technique for connecting the headlock cable thereto.

FIG. 4 is a partial view of an alternative headlock assembly 100, illustrating an alternative technique for connecting the headlock cable 26 thereto. In the embodiment illustrated in FIG. 4, the headlock assembly 100 includes a tapered portion 66 extending from the end of the plurality of external threads 54. The tapered portion 66 includes a hole 68 extending therethrough. The headlock cable 26 is threaded through the hole 68 and attached to the tapered portion 66, for example, via a knot, a crimp, or any technique that enables the headlock cable 26 to be attached to the headlock assembly 100. It is noted that while FIGS. 3 and 4 illustrate various methods for attaching the headlock cable 26 to the headlock assemblies 12 and 100, alternative methods may be employed, including, for example, and without limitation, attaching an eye screw to the headlock assembly.

Figure 5:
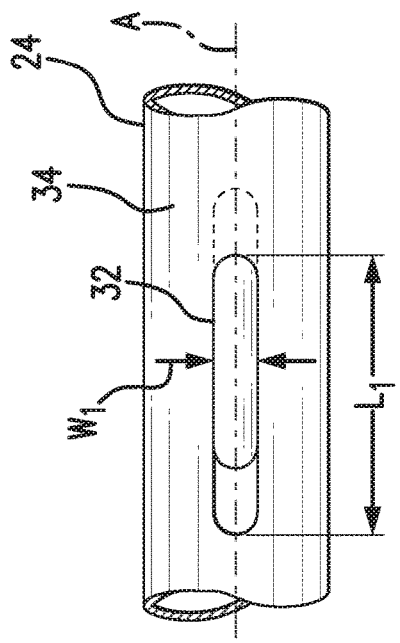
FIG. 5 is a view of a portion of the extension rod shown in FIG. 3, illustrating the slotted opening.

FIG. 5 is a view of a portion of the extension rod 24 shown in FIG. 3, illustrating the slotted opening 32. In the exemplary embodiment, the slotted opening 32 is generally positioned on the centerline "A" of the extension rod 24. The slotted opening 32 has a width $W_1$ that is in a range between and including about one hundred and ninety thousandths of an inch (0.190 in.) and about two hundred and ten thousandths of an inch (0.210 in.). Alternatively, in other aspects of the present invention, the slotted opening 32 can have any width that enables the extension rod 24 to function as described herein. Furthermore, the slotted opening 32 has a length $L_2$ that is in the range between and including about one quarter of an inch (0.25 in.) and about one inch (1 in.). Alternatively, in other aspects of the present invention, the slotted opening 32 can have any length that enables the extension rod 24 to function as described herein.

Referring back to FIG. 3, in the exemplary embodiment, the slotted opening 32 extends through the sidewall 34 of the extension rod 24 at an angle "α." The angle α facilitates enabling the headlock cable 26 to pass through the slotted opening 32 in a generally smooth manner. In the exemplary embodiment, the angle α is in a range between and including about twenty degrees (20°) and about forty-five degrees (45°). Alternatively, in other aspects of the present invention, the slotted opening 32 can be formed at any angle α that enables the extension rod 24 to function as described herein.

The extension rod 24 is a semi-flexible, resilient, hollow rod. This enables the extension rod 24 to bend when in use for installing cable assemblies, such as the pre-connectorized cable assembly 14 described herein. In addition, the extension rod 24 is able to spring back into shape after such bending. As shown in FIG. 1, the extension rod 24 has a large length to diameter (L/D) ratio. For example, in one suitable embodiment, the L/D ratio is in a range between and including about seventy to one (70:1) and about one hundred and fifty to one (150:1). In the exemplary embodiment, the extension rod 24 has a length $L_1$ that is in the range between and including about four feet (4 ft.) and about six feet (6 ft.). Furthermore, the extension rod 24 has a diameter $D_1$ that is in a range between and including about five hundred and thirty-seven thousandths of an inch (0.537 in.) and about six hundred and seventy-eight thousandths of an inch (0.678 in.), with a wall thickness Ti in the range between and including about sixty-eight thousandths of an inch (0.068 in.) and about one hundred and eleven thousandths of an inch (0.111 in.). Alternatively, in other aspects of the present invention, the extension rod 24 can have any combination of length, diameter, and wall thickness that enables the extension rod 24 to function as described herein.

In the exemplary embodiment, the extension rod 24 is fabricated as a unitary component from chlorinated polyvinyl chloride (CPVC). Alternatively, the extension rod 24 may be fabricated from any material that enables the extension rod 24 to function as described herein, including, for example, composite materials, resins, fiber reinforced resins, plastics, fiber reinforced plastics, and the like.

FIG. 6 is a perspective view of the headlock assembly 12 illustrated in the opened configuration 46. FIG. 7 is an end view of the headlock assembly 12 illustrated in the closed configuration 40, looking at the end wall 50. In the exemplary embodiment, the headlock assembly 12 extends longitudinally between a first end 70, having the plurality of external threads 54, and a second end 72, defined by the end wall 50. The headlock assembly 12 includes a body portion 74, a neck portion 76, and the hinged cap 38. The body portion 74 has an upper opening 78 and the cavity 48 defined therein. The neck portion 76 tapers generally radially inward from the body portion 74 to the plurality of external threads 54 at the first end 70. The neck portion defines a generally smooth radius transition, although other types of transitions are contemplated. The generally smooth transition between the neck portion 76 and the body portion 74 facilitates pulling the headlock assembly 12, for example, through cables, cabinets, etc., in the direction of the extension rod 24. It should be noted that, in suitable alternative embodiments, the headlock assembly 12 can include a similar neck portion extending from the body portion toward the second end 72. In such an embodiment, the additional neck portion can facilitate pushing the headlock assembly 12 through cabinets, cables, etc.

The body portion 74 is generally cylindrical in shape having a substantially constant outer diameter $D_2$ that is in a range between and including about one half of an inch (0.5 in.) and about one inch (1.0 in.). Alternatively, in other aspects of the present invention, the body portion 74 can have any diameter that enables the headlock assembly 12 to function as described herein. Furthermore, in certain aspects of the present disclosure, the body portion 74 can have any alternative shape that enables the headlock assembly 12 to function as described herein, including, for example, cuboid, spherical, polygonal, ellipsoid, and the like. The cavity 48 within the body portion 74 has a length $L_3$, a width $W_3$, and a depth $D_3$ that are configured to receive a connector therein, such as the connector 18 of the pre-connectorized cable assembly 14 (shown in FIG. 2). It is noted that the length $L_3$, width $W_3$, and depth $D_3$ are determined based upon a selected connector and/or connector family. In the exemplary embodiment, the length $L_3$, width $W_3$, and depth $D_3$ are selected to receive a standard RJ45 connector, as described above. The length $L_3$ is in a range between and including about one inch (1.0 in.) and about two and a half inches (2.5 in.). The width $W_3$ is in a range between and including about one half of an inch (0.5 in.) and about fifty-five hundredths of an inch (0.55 in.). Furthermore, the depth $D_3$ is in a range between and including about five hundred and thirty thousandths of an inch (0.530 in.) to about five hundred and forty thousandths of an inch (0.540 in.), based on a nominal outer diameter $D_2$ of three quarters of an inch (0.75 in.). Alternatively, in other aspects of the present invention, the cavity 48 can have any combination of length, width, and depth that enables the headlock assembly 12 to function as described herein.

The hinged cap 38 is a substantially semi-circular, elongated member having an outer radius $R_1$ that corresponds to the outer diameter $D_3$ of the body portion 74. The hinged cap 38 also has an inner radius $R_2$ that is concentric with the outer radius $R_1$. An end wall 80 extends across a first end 82 of the hinged cap 38. The end wall 80 facilitates providing structural rigidity to the hinged cap 38. In the exemplary embodiment, the inner radius $R_2$ is selected to be about one half (½) of the width $W_3$ of the cavity 48.

The hinged cap 38 is suitably positionable between a closed position (shown in FIG. 1) in which the cavity 48 of the body portion 74 is substantially inaccessible, and an opened position (FIG. 6) in which the cavity 48 of the body portion 74 is accessible. More particularly, the hinged cap 38 is hinged to the body portion 74 for hinged motion relative thereto between the closed and opened positions. For example, as shown in FIG. 6, the hinged cap 38 may be hinged to the body portion 74 in the manner of a "living hinge" 84—in which the hinged cap 38 is formed (e.g., molded) integrally with the body portion 74 along a thinned or scored connecting web that is sufficiently flexible to allow hinged motion of the hinged cap 38 relative to the body portion 74. It is understood, though, that the hinged cap 38 may be formed separate from the body portion 74 and mechanically hinged thereto by a suitable hinge mechanism (not shown) without departing from the scope of the present invention. The hinge 84 enables the hinged cap 38 to pivot about a pivot axis "P" between open and closed positions relative to the body portion 74.

In the exemplary embodiment, the pivot axis P is arranged generally parallel with a centerline "B" of the body portion 74. It is contemplated that the hinged cap 38 can be attached to the body portion 74 by any suitable attachment technique or can be separate from the body portion 74 until fully engaged to the body portion 74 in the closed position. When the hinged cap 38 is in the open position (FIG. 6), the upper opening 78 of the body portion 74 is unobstructed to provide access to the cavity 48, or the connector 18 as illustrated in FIG. 2. When the hinged cap 38 is in the closed position (FIG. 1), the upper opening 78 is covered or closed off to protect and retain the connector 18 within the headlock assembly 12.

Referring to FIG. 7, the end wall 50 includes the cable slot 52 defined therethrough for access to the cavity 48. In the exemplary embodiment, the cable slot 52 is open to the top of the body portion 74 (i.e., the cable slot has an open top) and has a width $W_2$ that is in a range between and including about three hundred and thirteen thousandths of an inch (0.313 in.) and about four hundred and thirty-eight thousandths of an inch (0.438 in.). Alternatively, in other aspects of the present invention, the width of the cable slot 52 can have any measurement that enables the headlock assembly 12 to function as described herein. The cable slot 52 has a full radius closed bottom end that is substantially concentric with the centerline "B" of the body portion 74. In other aspects of the present invention, the closed bottom end of the cable slot 52 can have any shape that enables the headlock assembly 12 to function as described herein.

In the exemplary embodiment, the headlock assembly 12 is fabricated as a unitary component from chlorinated polyvinyl chloride (CPVC). Alternatively, the headlock assembly 12 may be fabricated from any material that enables the headlock assembly 12 to function as described herein, including for example, metal, polyvinyl chloride (PVC), composite materials, resins, fiber reinforced resins, plastics, fiber reinforced plastics, and the like. In addition, the headlock assembly 12 can be fabricated using different manufacturing techniques, including without limitation, injection molding or extrusion, blow molding, machining, etc.

In operation, the headlock cable installation system 10 can be used in several ways to install the pre-connectorized cable assembly 14, for example, in a data center cabinet. For example, if a user wishes to route a pre-connectorized cable assembly 14 into a data center cabinet, such as through an opening in the top of the data center cabinet, the user may push the extension rod 24 and headlock assembly 12 up through the opening in the data center cabinet until the headlock assembly 12 is routed through the opening and is located outside the cabinet. The user can grasp the headlock assembly 12 or lower it by pushing a portion of the headlock cable 26 through the extension rod 24 for easier grasping.

The hinged cap 38 of the headlock assembly 12 is positioned by the user in the opened configuration 46, as shown in FIG. 2. The user places the connectorized end 16 of pre-connectorized cable assembly 14 into the cavity 48 of the body portion 74. More specifically, the connector 18 is placed into the cavity 48 and the cable 20 is positioned to extend through the cable slot 52. The user closes the hinged cap 38 of the headlock assembly 12 by rotating the hinged cap 38 about the pivot axis "P" (shown in FIG. 6) and secures the hinged cap 38 in the closed configuration 40 by snapping the latch finger 44 into the latch 42.

The user can then pull the extension rod 24 back through the data center cabinet and additionally pull the headlock cable 26 to facilitate pulling the headlock assembly 12 up and over the top of the data center cabinet and through the opening in the top of the data center cabinet. The user can then grasp the headlock assembly 12 and pull at least a portion of the pre-connectorized cable assembly 14 into the cabinet. The user then opens the hinged cap 38 and removes the connectorized end 16 of pre-connectorized cable assembly 14.

If the user wishes to route a pre-connectorized cable assembly 14 out of a data center cabinet, for example, through an opening in the top of the data center cabinet, the user positions the hinged cap 38 of the headlock assembly 12 in the opened configuration 46. The user places the connectorized end 16 of pre-connectorized cable assembly 14 into the cavity 48 of the body portion 74. More specifically, the connector 18 is placed into the cavity 48 and the cable 20 is positioned to extend through the cable slot 52. The user closes the hinged cap 38 of the headlock assembly 12 by rotating the hinged cap 38 about the pivot axis "P" (shown in FIG. 6) and secures the hinged cap 38 in the closed configuration 40 by snapping the latch finger 44 into the latch 42. The user can then remove any slack in the headlock cable 26 by pulling it through the extension rod 24 and may couple the headlock assembly 12 to the extension rod 24, if desired and/or required.

The user may then push the extension rod 24 and headlock assembly 12 up through the opening in the data center cabinet until the headlock assembly 12 is routed through the opening and is located outside the cabinet. The user can grasp the headlock assembly 12 or lower it by pushing a portion of the headlock cable 26 through the extension rod 24 for easier grasping. The user may then pull at least a portion of the pre-connectorized cable assembly 14 up through the cabinet opening. The user then opens the hinged cap 38 and removes the connectorized end 16 of pre-connectorized cable assembly 14.

While the descriptions of operation are described above with reference to routing the pre-connectorized cable assembly 14 through an opening in the top of a data center cabinet, it is noted that the steps may be performed in substantially the same manner for pushing or pulling the pre-connectorized cable assembly 14 along the tops of or through a data center cabinet in any manner that may be required by the user, including, for example, routing a cable from the front to the back of the cabinet. As described above, the extension rod 24 is semi-flexible and resilient, and as such, can be bent or flexed to facilitate routing of the extension rod 24, for example, through a data center cabinet.

Figure 8:
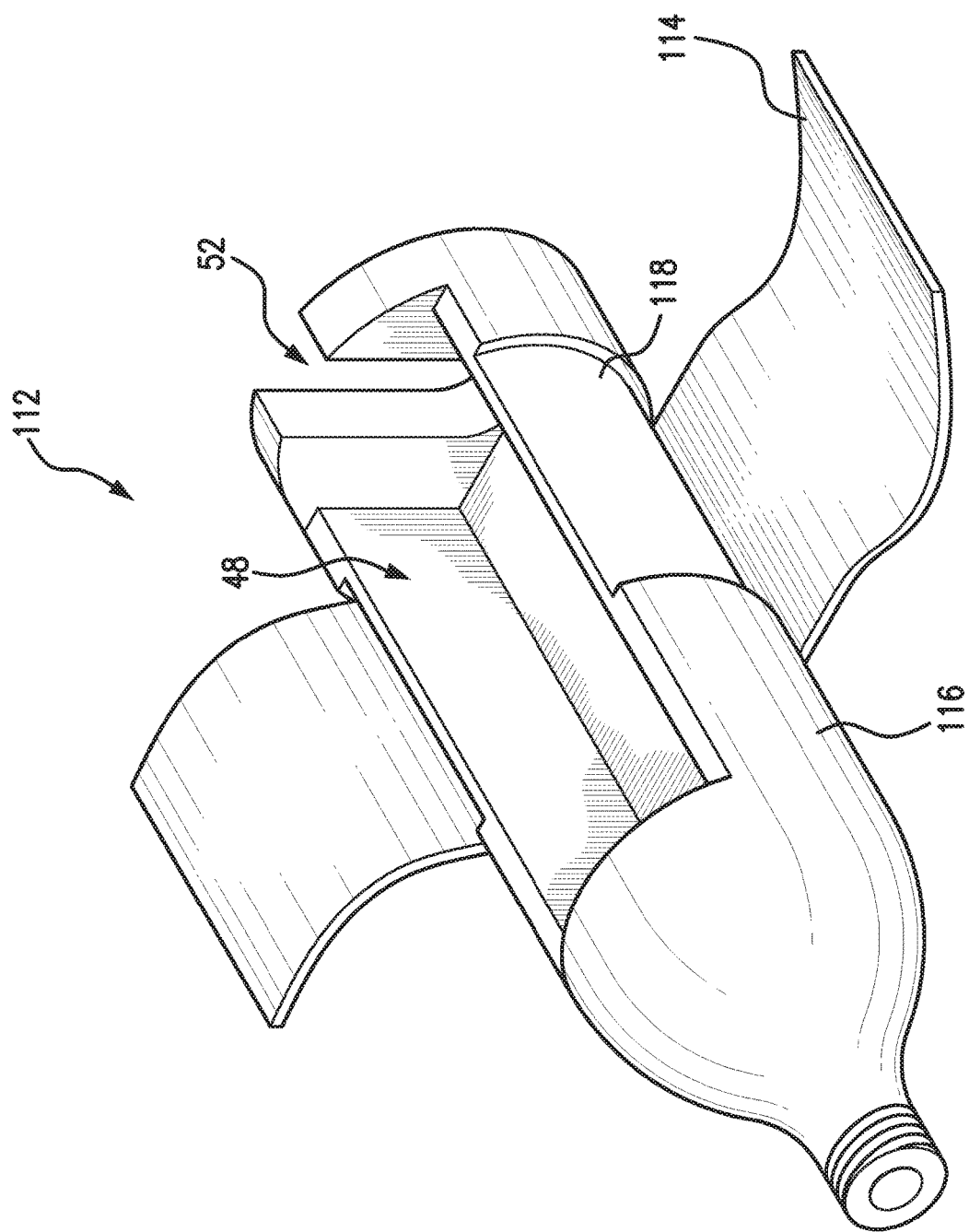
FIG. 8 is an alternative headlock assembly, in accordance with another aspect of the present invention.

FIG. 8 is an alternative headlock assembly 112, in accordance with another aspect of the present invention. It is noted that the headlock assembly 112 is substantially identical to the headlock assembly 12, except as described below. The headlock assembly 112 is free of a hinged cap, such as the hinged cap 38. Rather, the headlock assembly 112 includes a closure strap 114 for holding or securing a connector, such as the connector 18 described herein. A body portion 116 of the headlock assembly 112 includes a groove 118 that extends circumferentially around the outside of the body portion 116. The closure strap 114 is disposed at least partially within the groove. In one suitable embodiment, the closure strap 114 is coupled to the body portion 116 opposite the cavity 48, although in other suitable embodiments, the closure strap 114 may be separate from the headlock assembly 112.

In embodiments where the closure strap 114 is coupled to the body portion 116, the closure strap 114 may be coupled using any means that enables the closure strap 114 to be attached thereto. For example, and without limitation, the closure strap 114 may be attached to the body portion using one or more of an adhesive, screw, rivet, and the like. The closure strap 114 may include, for example, and without limitation, a flexible strap, hook-and-loop fastener material, strap having a mechanical snap or magnet closure, and the like to facilitate retaining the connector 18 within the cavity 48.

In use, a user places the connectorized end 16 of pre-connectorized cable assembly 14 into the cavity 48 of the body portion 116. More specifically, the connector 18 is placed into the cavity 48 and the cable 20 is positioned to extend through the cable slot 52. The user closes or secures the closure strap 114 around the body portion 116 and the connector 18. The closure strap 114 facilitates keeping the connector 18 in place during installation of the pre-connectorized cable assembly 14.

FIG. 9 is a perspective view of an alternative headlock cable installation system 150 having an alternative headlock assembly locking feature, an alternative extension rod locking feature, and a removable insert. FIG. 10 is a perspective view of a portion of the headlock cable installation system 150. It is noted that the locking features and removable insert described with respect to the headlock cable installation system 150 have general applicability to the headlock cable installation system 10, headlock assembly 12, and headlock assembly 112 described herein.

In the embodiment illustrated in FIG. 9, the headlock cable installation system 150 includes a headlock assembly 152, an extension rod 154, and the headlock cable 26 coupled to the headlock assembly 152. The headlock cable 26 extends through at least a portion of the extension rod 154. The headlock cable installation system 150 is configured to push and pull a pre-connectorized cable assembly 14. As such, the headlock assembly 152 is releasably couplable to the extension rod 154 to enable the headlock assembly 152 to be pushed by the extension rod 154.

A plurality of locking channels 156 are defined within an end of the extension rod 154. Each locking channel 156 cooperates with a respective radially-extending locking pin 158 extending from a mating end 160 of the headlock assembly 152. In the illustrated embodiment, there are two (2) locking channels 156 and corresponding radially-extending locking pins 158. However, in alternative aspects of the invention, there can be fewer or more locking channels 156 and corresponding locking pins 158.

As illustrated in FIG. 10, the locking channels 156 are generally J-shaped, having the longer leg opened to the end of the extension rod 154. In the illustrated embodiment, the locking channels 156 extend entirely through the sidewall of the extension rod 154, although in alternative embodiments, the locking channels 156 can be formed within a portion of the sidewall.

In the illustrated embodiment, the headlock assembly 152 is inserted into the hollow portion of the extension rod 154 such that the locking pins 158 are aligned with openings 162 of the locking channels 156. The headlock assembly 152 is slid further into the extension rod 154 such that the locking pins pass along a first leg 164 of the locking channels 156. When the locking pins 158 reach a second leg 166 of the locking channels 156, the headlock assembly 152 is rotated. This enables the locking pins 158 to pass along the second leg 166 to interlock the headlock assembly 152 with the extension rod 154. The headlock assembly 152 is rotated until the locking pins 158 reach a third leg 168 of the locking channels 156. The headlock assembly 152 is then pulled outward to position or capture the locking pins 158 within the third leg 168, thereby capturing or coupling the headlock assembly 152 to the extension rod 154.

The headlock assembly 152 can be easily removed from the extension rod 154 by pushing the headlock assembly 152 into the extension rod 154 and rotating the headlock assembly 152 to align the locking pins 158 with the first leg 164 of the locking channels 156. The headlock assembly 152 may then be pulled from the extension rod 154. In this embodiment, no threads or other fasteners are required to attach and release the headlock assembly 152 to and from the extension rod 154.

Referring to FIG. 9, the illustrated headlock cable installation system 150 also includes a removable insert 170 sized to fit within the cavity 48 of the headlock assembly 152. The insert 170 has an overall length $L_4$, width $W_4$, and a height $H_4$ that are configured to fit within the cavity 48, defining a sliding fit therebetween. In addition, the insert has an internal cavity 172 that is sized and shaped to receive a connector therein. The insert cavity 172 is smaller than the cavity 48 of the headlock assembly 152. As such, the insert 170 enables the headlock assembly 152 (and the headlock assemblies 12 and 112) to receive a pre-connectorized cable assembly 14 having a connector (e.g., an LC, MT-RJ, or MTP/MPO optical fiber connector) that is smaller and/or differently shaped that the connector 18, described above. The use of the insert enables the headlock assembly 152 to be used with two (2) differently sized and shaped connectors, thereby increasing the efficiency of installing different pre-connectorized cable assemblies 14 (e.g., RJ45 copper network cables and LC-type optical fiber cables). Multiple different inserts may be provided, each being configured for use with at least one of a variety of connectors.

Advantageously, embodiments of the present invention provide for the efficient installation and routing of cables, and in particular, pre-connectorized cable assemblies, in data center cabinets. The headlock cable installation system enables a user to easily route cables into and out of data center cabinets without the need to use ladders to route the cables along the tops of the data center cabinets. In addition, the headlock cable installation system facilitates protecting the connectors of the pre-connectorized cable assemblies from becoming snagged or caught on other cables and/or components, which can damage the connectors. The headlock assembly enables the user to quickly attach and detach a pre-connectorized cable assembly to the headlock cable installation system, thereby reducing time need for routing the cables through a data center and/or a data center cabinet.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

What is claimed is:

1. A headlock cable installation system for installing a pre-connectorized cable assembly, said headlock cable installation system comprising:
   a headlock assembly defining a cavity configured to receive a connectorized end of the pre-connectorized cable assembly therein;
   an extension rod; and
   a flexible headlock cable having opposite first and second ends,
   said first end of said headlock cable being coupled to said headlock assembly,
   said second end of said headlock cable being adjustably coupled to said extension rod with adjustment of said second end varying a position of said headlock assembly relative to said extension rod; and
   a removable insert slidably received in the cavity of said headlock assembly.

2. The headlock cable installation system in accordance with claim 1,
   said extension rod being at least partly tubular to present an internal cavity,
   said headlock cable being received in part within the internal cavity,
   said first and second ends of said headlock cable extending externally from said extension rod.

3. The headlock cable installation system in accordance with claim 2,
   said extension rod comprising an open first end and a sidewall defining the internal cavity,
   said sidewall comprising an opening defined therethrough,
   said second end of said headlock cable extending through said open first end of said extension rod into the internal cavity,
   said second end of said headlock cable further extending outward from the internal cavity through the sidewall opening.

4. The headlock cable installation system in accordance with claim 3,
   said open first end of said extension rod being threaded,
   said headlock assembly being threadably coupled to said extension rod.

5. The headlock cable installation system in accordance with claim 3,
   said second end of said headlock cable being arranged in a loop to facilitate pulling said headlock cable through said extension rod.

6. The headlock cable installation system in accordance with claim 3,
   said headlock assembly having a first assembly end, a second assembly end, and a body portion extending therebetween,
   said body portion having the cavity defined therein and comprising an end wall defining the second assembly end,
   said first end of said headlock cable comprising one or more radially-extending locking pins,
   said open first end of said extension rod comprising one or more locking channels,
   each of said locking pins having a corresponding locking channel of the one or more locking channels,
   said headlock assembly being coupled to said extension rod wherein each of said locking pins is captured within its corresponding locking channel.

7. The headlock cable installation system in accordance with claim 3,
   said headlock assembly having a first assembly end, a second assembly second end, and a body portion extending therebetween,
   said body portion having the cavity defined therein and comprising an end wall defining the second assembly end,
   said end wall of the body portion defining a cable slot therein,
   said cable slot having an open top for receiving at least a portion of the pre-connectorized cable assembly therein.

8. The headlock cable installation system in accordance with claim 1,
   said headlock assembly comprising a hinged cap positionable between an opened position, wherein the cavity is accessible, and a closed configuration for holding the connectorized end of the pre-connectorized cable assembly within the cavity.

9. The headlock cable installation system in accordance with claim 8,
   said headlock assembly comprising a body portion,
   said hinged cap coupled to the body portion for hinged motion relative thereto.

10. The headlock cable installation system in accordance with claim 1,
    said headlock assembly having first and second assembly ends, a body portion, and a neck portion,
    said body portion having the cavity defined therein and comprising an end wall defining the second assembly end,
    said first assembly end comprising a plurality of external threads,
    said neck portion tapering radially inward from the body portion to the plurality of external threads at the first assembly end.

11. The headlock cable installation system in accordance with claim 10,
    said headlock assembly further comprising a hinged cap positionable between an opened position, wherein the cavity is accessible, and a closed configuration for holding the connectorized end of the pre-connectorized cable assembly within the cavity.

12. The headlock cable installation system in accordance with claim 11,
    said body portion being cylindrical in shape and having a substantially constant outer diameter.

13. The headlock cable installation system in accordance with claim 12, said hinged cap being formed as a substantially semicircular, elongate member having an outer radius that corresponds to the outer diameter of the body portion.

14. The headlock cable installation system in accordance with claim 11, said hinged cap comprising a latch finger, said body portion comprising a latch for receiving the latch finger when the hinged cap is in the closed configuration.

15. The headlock cable installation system in accordance with claim 11, said hinged cap coupled to the body portion via a hinge for hinged motion relative thereto, said hinge comprising a living hinge.

16. The headlock cable installation system in accordance with claim 1, said headlock assembly defining a centerline and a counterbore hole concentric with the centerline, said counterbore hole extending from the cavity through a first end of the headlock assembly, said first end of the headlock cable extending into the counterbore hole, said headlock cable installation system further comprising a locking element coupled to the first end of the headlock cable and positioned within the counterbore to couple the headlock cable to the headlock assembly.

17. The headlock cable installation system in accordance with claim 1, said headlock assembly comprising a cylindrical body portion and having a circumferential groove defined therein, said headlock assembly further comprising a closure strap disposed at least partially within said groove.

18. The headlock cable installation system in accordance with claim 17, said closure strap being coupled to said body portion via one or more of an adhesive, a screw, and a rivet.

19. The headlock cable installation system in accordance with claim 1, said insert comprising an internal cavity that is smaller than the cavity of the headlock assembly, said internal cavity sized and shaped to receive at least a portion of the pre-connectorized cable assembly therein.

\* \* \* \* \*